United States Patent
Friebe et al.

(10) Patent No.: US 6,588,211 B2
(45) Date of Patent: Jul. 8, 2003

(54) MOTOR VEHICLE WITH A DRIVE COMBUSTION ENGINE

(75) Inventors: Peter Friebe, Kirchheim (DE); Uwe Griesmeier, Markdorf (DE); Berthold Keppeler, Owen (DE); Jürgen Ludwig, Bempflingen (DE)

(73) Assignee: Ballard Power System AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/985,181

(22) Filed: Nov. 1, 2001

(65) Prior Publication Data

US 2002/0056580 A1 May 16, 2002

(30) Foreign Application Priority Data

Nov. 1, 2000 (DE) .......................... 100 54 007

(51) Int. Cl.$^7$ ................................ F01B 21/04
(52) U.S. Cl. ............................ 60/716; 60/614
(58) Field of Search .................. 60/597, 716, 614, 60/616, 618

(56) References Cited

U.S. PATENT DOCUMENTS

| | | | | |
|---|---|---|---|---|
| 5,458,095 A | * | 10/1995 | Post et al. ................ | 123/3 |
| 5,858,568 A | * | 1/1999 | Hsu et al. ................ | 429/13 |
| 5,950,752 A | * | 9/1999 | Lyons ..................... | 180/65.2 |
| 6,053,132 A | * | 4/2000 | Evans ..................... | 123/41.5 |
| 6,223,844 B1 | * | 5/2001 | Greenhill et al. .......... | 180/65.3 |

FOREIGN PATENT DOCUMENTS

| | | | |
|---|---|---|---|
| DE | 19703171 | * | 8/1998 |
| DE | 19913795 | | 10/2000 |

* cited by examiner

*Primary Examiner*—Hoang Nguyen
(74) *Attorney, Agent, or Firm*—Crowell & Moring LLP

(57) ABSTRACT

A motor vehicle has a drive combustion engine and a power supply system for supplying electric consuming devices on-board the motor vehicle. The power supply system includes a fuel cell system and a battery coupled to the fuel cell system. The energy and/or material currents of the drive combustion engine and the fuel cell system are coupled together.

1 Claim, 1 Drawing Sheet

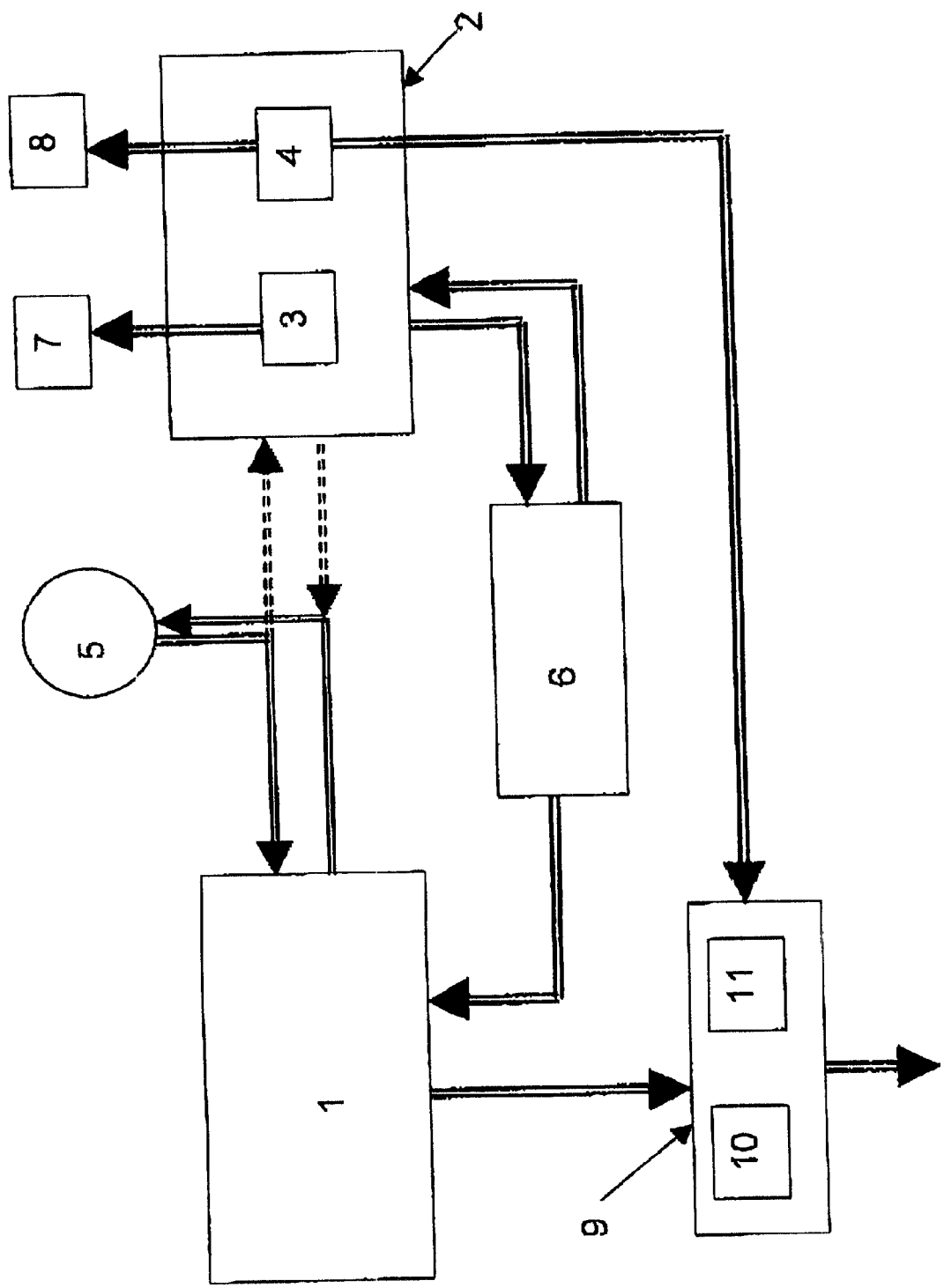

MOTOR VEHICLE WITH A DRIVE COMBUSTION ENGINE

This application claims the priority of German Patent Document DE 100 54 007.4, filed Nov. 1, 2000, the disclosure of which is expressly incorporated by reference herein.

BACKGROUND OF THE INVENTION

The present invention relates to a motor vehicle with a drive combustion engine and a power supply system.

The electric power, available for the electric consuming devices on-board a motor vehicle, is based in particular on the size and capacity of the electric generator, which usually exhibits a power output ranging from 1.5 to 2.5 kW. Thus, some electric consuming devices can be operated only when the internal combustion engine is on.

DE 197 03 171 A1 discloses a motor vehicle that is driven by a drive combustion engine and which contains a fuel cell system as the current generator (APU auxiliary power unit). This system supplies the electric consuming devices in the motor vehicle with energy and can be activated independently of running the internal combustion engine. The fuel cell system also supplies the drive combustion engine with electric energy. A battery is connected to the fuel cell system to release current as soon as the combustion engine is started and covers brief peak loads. Thus, the fuel cell system, comprising fuel cells and gas generating system, and the battery form a hybrid system to supply electric energy.

SUMMARY OF THE INVENTION

An object of the present invention is to improve a motor vehicle of the generally known type such that an economical, compact and efficient integration of a hybrid system comprising fuel cells-APU and battery can be achieved.

This object has been by way of a motor vehicle in which the energy and/or material currents of the engine and fuel cell system are coupled together. The terms "APU" and fuel cell system are used synonymously in the following description.

In particular, the following advantages are now obtainable with the present invention:

improved efficiency;

fuel savings;

use of common modules is possible;

lower overall height;

cost reduction;

reduced the start time of the gas generating system in the fuel cell system and the exhaust gas catalyst in the exhaust gas stream of the combustion engine;

reduction in emissions, in particular the starting emission.

In an advantageous currently contemplated embodiment of the present invention, the drive combustion engine and the fuel cell system are disposed in a common cooling circuit. The result is a compact configuration because there is no need for separate cooling systems for the internal combustion engine and the fuel cell system. If necessary, the cooler that is used can be enlarged compared to the conventional cooler for a motor vehicle.

The lines to transport the coolant in the cooling system are coupled advantageously from a thermal view point to the body of the motor vehicle. The lines can run inside or outside the body, for example, in the area of the door sill. The line length between the APU (for example, placed in the rear of the motor vehicle) and the cooler (for example, placed in the front of the motor vehicle) can be used advantageously as the cooling distance. The lines can be disposed, in particular, in continuous cavities through the body of the motor vehicle, thus economizing on cost intensive fastening material on the bottom side of the motor vehicle. The APU and internal combustion engine can resort to peak cooling capacities at different operating points because the engine needs the peak cooling capacity in drive mode and the APU needs it when the vehicle is standing still.

When air conditioning the interior of the motor vehicle in standing mode, the APU can be started, with the drive combustion engine off, to generate electric energy to cool the passenger interior. At low outside temperatures, the motor vehicle can be preheated by starting the gas generating system of the APU. To this end, it is unnecessary to start up the entire fuel cell system. The requisite electric energy can be taken from the battery. Thermal energy can be obtained by burning fuel.

In another advantageous configuration of the present invention, the gas generating system of the fuel cell system is coupled thermally with the exhaust gas line of the drive combustion engine. Thus, should the APU not be used when the drive combustion engine is running, the APU can be held at the appropriate operating temperature by dissipated engine heat. Thus, if necessary, the APU can be started significantly faster. On the other hand, in the start phase of the motor vehicle the APU can preheat the exhaust gas catalyst of the engine, thus reducing the exhaust gas emission at startup because the starting temperature of the catalyst is reached faster. It is also contemplated, however that the APU will preheat the drive combustion engine by way of the cooling water when the motor vehicle is in standing mode. Thus, the start comfort is improved and the service life of the engine is extended.

Another contemplated arrangement for reducing the exhaust gas emission, in particular to reduce nitrogen oxides, is to meter hydrogen from the gas generating system into the exhaust gas stream.

In yet another advantageous embodiment of the present invention, in addition to the drive combustion engine, there is an electric motor which, in support of or as an alternative to the drive combustion engine, guarantees the drive of the vehicle. In case of engine damage, the APU can be switched such that, for example, it serves as the drive aggregate for the electric motor. The electric motor can be, for example, the crank or starter of the motor vehicle or a generator. Thus, the motor vehicle can be driven without external assistance to the closest repairshop. The results are advantages for off-road operation of the motor vehicle and with respect to safety in sparsely populated areas.

The additional electric motor has other advantages such as, for example, when motor vehicles are prohibited from driving due to smog. Then the motor vehicle can be operated with the combustion engine turned off, whereby the electric motor serves as the main drive of the motor vehicle. Furthermore, the electric motor can be used as the main drive, for example, in congested traffic or in city traffic (stop-and-go traffic). There are also additional advantages with respect to fuel savings.

It is also possible with the present invention to reduce a motor vehicle's susceptibility to breakdowns with respect to the electrical supply. Thus, for example, the battery can be charged automatically by the protection circuit after prolonged periods of idling or in the case of leak current without having to start the engine and without the presence of the driver. Furthermore, the cooling water can be monitored by a sensor and, if necessary, heated so that in the winter, for example, frost damage to the cooler can be avoided.

Other advantages resulting from the integration of a hybrid system comprising a fuel cell system and battery into a motor vehicle occur at peak load on the system in the start phase, during which the use of the battery is quite conservative. In this respect one also speaks about peak shaving. Another advantage is the faster availability of larger quantities of electric energy.

In addition, the dynamics of the APU is improved during vehicle operation. The results are advantageous with respect to the service life of the APU and the drive combustion engine. To save fuel, the drive combustion engine can be turned off, for example, when driving downhill. The APU takes over the task of supplying, for example, the brake booster and the power steering with electrical power for safer driving.

In addition, the battery is discharged so as to conserve the battery when the motor vehicle is in standing mode and, at the same time, the electric consuming devices are operating, but not to the point of exhaustive discharge. Thus, it is now possible, for example, to integrate a plug with 220 V on board the motor vehicle. In addition, the energy of the battery can be used over a prolonged period of time.

To realize such a hybrid system, one can resort to the starter battery, which is already present in conventional motor vehicles. This starter battery is quite appropriate with respect to power and capacity to form together with the APU a hybrid system.

To optimize the water management of the APU, the liquid water, accumulated in the air conditioning system of the motor vehicle, can be used. This liquid water can be used, for example, to cool the fuel cell system or to moisten the gases, generated in the gas generating system. At high outside temperatures, more liquid water is accumulated owing to the operation of the air conditioning system, thus facilitating the APU management with respect to cooling capacity and water management, which is rendered more difficult during these operating conditions (high outside temperature).

Furthermore, when the engine is turned off, a larger number of electric consuming devices can be supplied with electric power than is possible in the state of the art. In addition, mechanically driven parts can be driven electrically (i.e. "beltless motor").

BRIEF DESCRIPTION OF THE DRAWINGS

Other objects, advantages and novel features of the present invention will become apparent from the following detailed description of the invention when considered in conjunction with the accompanying drawings.

The sole figure is a schematic drawing of the assembly of a motor vehicle with a drive combustion engine and an APU according to the present invention.

DETAILED DESCRIPTION OF THE DRAWING

The more important components of the assembly comprising the drive combustion engine 1 and the APU 2 are a fuel cell stack 3 and a gas generating system 4. The hydrogen rich fuel gas for the fuel cell stack is generated in the gas generating system. The motor vehicle cooler 5 of the motor vehicle is connected to the drive combustion engine 1 and the APU 2. Thus, the combustion engine 1 and the APU 2 can be cooled simultaneously and by a common cooler 5.

The drive combustion engine 1 is connected to a battery 6. Especially during the start phase of the engine 1, the engine 1 is supplied with electric energy by the battery 6. At the same time, the APU 2 and the battery 6 are connected together, thus forming a hybrid system for the purpose of supplying the current for the vehicle. Thus, the APU 2 can prevent peak loads on the battery 6 during the start phase of the motor vehicle. In addition, the battery 6 can be charged by the APU, for example, during prolonged standing periods of the motor vehicle. The battery 6 can also deliver additional energy of the APU 2 to supply the electric consuming devices.

The fuel cell stack 3 of the APU 2 is connected to the electric consuming devices 7, for example, the air conditioning unit. The gas generating system 4 is connected thermally to the auxiliary heating 8 to heat the vehicle interior.

The exhaust gas of the internal combustion engine 1 is passed through a system 9, comprising a heat exchanger 10 and/or an exhaust gas catalyst 11. This system 9 is coupled thermally with the gas generating system 4 of the APU 2. Thus, the gas generating system 4 can be preheated by the exhaust gas heat of the internal combustion engine 1. When the engine 1 is running, the gas generating system 4 is kept warm and is available, upon demand, in a short time. The exhaust gas catalyst 11 can also be preheated with the heat of the gas generating system 4 before the engine 1 is started. Thus, the catalyst can reach very quickly its working temperature, so that a decrease in the start emission of the engine is achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle comprising a drive combustion engine and a power supply system for supplying electric consuming devices on-board the motor vehicle, the power supply system including a fuel cell system and a battery coupled to said fuel cell system, such that energy and/or material currents of the drive combustion engine and the fuel cell system are operatively coupled together, wherein a gas generating system of the fuel cell system, an exhaust gas line of the drive combustion engine and an exhaust gas treatment catalyst in the exhaust gas line of the drive combustion engine are operatively coupled thermally.

* * * * *